United States Patent [19]

Sosnowski

[11] 3,928,141
[45] Dec. 23, 1975

[54] METHOD AND APPARATUS FOR NITROBLUE TETRAZOLIUM (NBT) TESTS FOR CHRONIC GRANULOMATOUS DISEASE AND RELATED SYNDROMES

[75] Inventor: Zenon Sosnowski, Winnipeg, Canada

[73] Assignee: International Diagnostic Products Ltd., Winnipeg, Canada

[22] Filed: Mar. 6, 1975

[21] Appl. No.: 555,805

[30] Foreign Application Priority Data
Mar. 12, 1974 Canada................................ 194717

[52] U.S. Cl. ........................ 195/103.5 R; 23/230 B
[51] Int. Cl.² ..................... C12K 1/04; G01N 31/00
[58] Field of Search....... 195/99, 103.5 R; 23/230 B

[56] References Cited
UNITED STATES PATENTS
3,834,874   9/1974   Gottlieb et al............... 195/103.5 R Primary Examiner—A. Louis Monacell
Assistant Examiner—C. A. Fan
Attorney, Agent, or Firm—Stanley G. Ade

[57] ABSTRACT

The classic nitroblue tetrazolium (NBT) test utilizes the sensitivity of the NBT dye to the Leukocyte specific Oxidase activity and is used to evaluate the polymorphonuclear leukocyte activity in granulomatous disease and related syndromes. PMN leukocytes, monocytes and eosinophilis from patients with CGD fail to reduce NBT dye (yellow) to blue formazan (deep blue), due to faulty oxidation of the nucleotides by their oxidases. The NBT as a hydrogen acceptor does not accept hydrogen directly from a substrate, but through an oxidase. Improved results are obtained in a greater number of related diseases by the use of a mixture of a reagent such as NBT mixed in distilled water to which dried human plasma is added. This is an unstimulated solution to which a blood sample is added and the reactions studied. The addition of a selected Lipopolysaccharide provides a stimulated solution used in the diagnosis of various diseases.

11 Claims, No Drawings

METHOD AND APPARATUS FOR NITROBLUE TETRAZOLIUM (NBT) TESTS FOR CHRONIC GRANULOMATOUS DISEASE AND RELATED SYNDROMES

BACKGROUND OF THE INVENTION

This invention relates to new and useful improvements in classical nitroblue tetrazolium (NBT) tests used for chronic granulamatous disease and related syndromes. The test is also used as an aid in differentiating bacterial and non-bacterial illnesses. In bacterial infections there is increased leukocyte membrane permeability which is utilized by the NBT dye.

Conventionally, nitroblue tetrazolium reduction tests are used to evaluate the polymorphonuclear leukocyte activity in chronic granulomatous disease.

Conventionally, the nitroblue tetrazolium dye was added to whole blood together with a buffer system, but unfortunately this mixture cannot be frozen or stored and fresh reagents are needed each time a test is required.

When the dye is added to the whole blood, bacterial infection weakens the walls of the white cell and the dye enters. After staining, these are then counted under a microscope.

The present invention overcomes disadvantages inherent in conventional tests by mixing the tetrazolium dye with distilled water and a dried human plasma.

It has been found that this can be frozen and preserved for several months and can be ready for use very quickly.

Another object of the present invention apart from producing a reagent which can be stored and frozen, is to provide such a reagent in either a stimulated or unstimulated state.

If a stimulated reagent is required, a lipopolysaccharide is added to the distilled water into which the dye is dissolved and once again, after the addition of dried human plasma, the resulting reagent can be frozen and stored over several months.

With the foregoing objects in view, and other such objects and advantages as will become apparent to those skilled in the art to which this invention relates as this specification proceeds, my invention consists essentially in the arrangement and construction of parts all as hereinafter more particularly described.

DETAILED DESCRIPTION

The test hereinafter to be described has been modified from a classical nitroblue tetrazolium (NBT) test which utilizes the sensitivity of the NBT dye to the leukocyte specific oxidase activity. Oxidized NBT is pale yellow in appearance but when reduced by the leukocytes to NBTH, it is deposited as blue intracellular inclusions (Blue Formazan).

The test is specific for chronic granulomatous disease and related syndromes as described later. This test also is used as an aid in differentiating between bacterial and non-bacterial illnesses. In bacterial infections there is increased leukocyte membrane permeability which is utilized by the NBT dye.

NBT reduction tests were developed to evaluate the polymorphonuclear (PMN) leukocytes activity in chronic granulomatous disease (CGD). PMN leukocytes, monocytes and eosinophils from patients with CGD fail to reduce NBT dye (yellow) to blue formazan (deep blue), due to faulty oxidation of the nucleotides by their oxidases. The NBT as a hydrogen acceptor does not accept hydrogen directly from a substrate, but through an oxidase. It has been proposed that the activity of a cyanide-insensitive NADH oxidase is necessary for NBT reduction in vitro and hydrogen peroxide generation in vivo.

NBT reduction is increased in patients with bacterial infections and in new born healthy infants whose leukocyte metabolic activity is higher than in adults. Therefore, in the latter, the NBT test is not recommended during the first two months of life when diagnosing bacterial infection.

It has been observed that endotoxin stimulates the PMN leukocytes and increases its metabolic activities in vitro. An investigation has been undertaken on the features of endotoxin to increase the NBT reduction by PMN leukocytes. However, additional endotoxin has no effect on NBT reduction by PMN leukocytes from patients with CGD and related syndromes.

The degree of reduction of NBT by the PMN leukocytes depends on the severity of their metabolic abnormality (homozygous), (heterozygous) (intermediate). Failure has been noted of NBT reduction in premature infants with severe bacterial infections. It has been suggested that similar mechanism appears in premature infants with susceptibility to bacterial infection and children with CGD. CGD appears in at least its two forms (an X-linked and autosomal recessive) and is characterized by marked impairment of bactericidal and fungicidal activities of the PMN leukocytes.

The present invention discloses a novel reagent together with a method of manufacturing same which enables it to be frozen and stored over several months and warmed for use when desired, thus eliminating the necessity of preparing new reagent each time the test is required.

It is desirable that the various apparatus and materials are produced in kit form so that an operator may make up the necessary materials as desired.

Dealing first with the unstimulated reagent, the following is an example of preparation for the reagent. However, it will be appreciated that the quantities can be varied although the relationship between the various components should be kept within relatively small limits in order to maintain the efficiency of the reagent.

One ml of distilled water is transferred to an amber glass phial into which has been placed 4 mg of nitroblue tetrazolium dye. After several minutes of agitation, the dye will be dissolved and the contents may be transferred to a phial containing dry human plasma.

About 80 mg of dried plasma is added and this is sufficient for ten individual test samples of the reagent.

The prepared reagent is then pipetted in 0.1 ml aliquots into polypropylene tubes which are then sealed with parafilm "M" and are then frozen and maintained in this condition in amber glass container.

If, of course, the reagents are required for immediate use, they are not frozen.

When it is desired to use the reagent in an unstimulated test, 0.1 ml of blood are collected into a heparinized tube (to prevent clotting) and this is transferred to a sample of the reagent which has been thawed out or has been freshly prepared. The reagent should be previously pre-warmed to approximately 37°C and the mixture of the reagent and blood is allowed to incubate for approximately 25 minutes at this temperature. Two smears are then made in the usual manner and these smears are air-dried and Wright's stained in a convenient way according to usual laboratory procedure.

The Wright's stained smears are examined under a microscope and are scored so that 100 consecutive PMN-leukocytes are counted. Only the PMN-leukocytes with a large dark blue deposit (at least the size of a small blood platelet or larger blocks) are considered to be the NBT positive, and any stippling due to NBT reduction in the PMN-leukocytes is ignored.

If a stimulated test is required, then the reagents are modified.

The reagents for the stimulated tests consist of several varieties, each of which may be broken down into specific samples utilizing different concentrations of endotoxins (lipopolysaccharides).

All of the stimulated reagents have a common ingredient such as the NBT dye and the dried human plasma. The stimulator is re-constituted in the distilled water which is then added to the NBT dye and the plasma and may be stored and frozen as hereinbefore described.

Given below are examples of specific reagents stimulated by different lipopolysaccharides.

1. Lipopolysaccharide E. Coli endotoxin in a variety of concentrations per test as follows:
   1. 1 microgram
   2. 5 micrograms
   3. 10 micrograms
   4. 20 micrograms
   5. 30 micrograms
   6. 50 micrograms
   7. 100 micrograms
   8. 200 micrograms
2. Lipopolysaccharide Staphylococcus 17A reagent in concentrations similar to those shown above.
3. Lipopolysaccharide S. Marcescens reagent in concentration as shown above.
4. Lipopolysaccharide S. Enteritidis reagent in concentration as shown above.

SYNDROMES RELATED TO CGD WITH DEFECTIVE NBT REDUCTION (unstimulated and stimulated)
1. Job's syndrome
2. Lipochrome histiocytosis
3. Glucose -6- Phosphate Dehydrogenase complete or almost complete deficiency in the leukocytes.
4. Acquired CGD Reduction of NBT depends also in gammaglobulines and complement.

The above described stimulated reagent is helpful in differentiating myeloid and monocytic leukemias.

The results of the use of unstimulated reagents are normal in:
1. Patients with leukocytosis of non-bacterial origin.
2. Viral illnesses.
3. Localized superficial infections.

The results of the use of the unstimulated reagents are increased in:
1. Bacterial infections involving systemic circulation.
2. Newborn infants up to 2 months of age.
3. Malaria infections, Laiosis, trichinosis, amoebic liver abscess.
4. Mycoplasma infection.
5. Hemophiliacs (severe cases).
6. Miliary tuberculosis and tuberculous meningitis.

The results of the use of the unstimulated reagents is decreased or absent of NBT reduction:
1. CGD and related syndromes (see below).
2. Congenital or acquired agammaglobulinemia.
3. Severe Glucose - 6 - Phosphate Dehydrogenase deficiency.

The results of the use of the stimulated reagents are completely abnormal in:
1. CGD and related syndromes (homozygous patients).

The normal range and scoring is as follows:
1. In the use of the unstimulated reagent — 0 to 11%
2. In the use of the stimulated (200 upEnd.) 94 - 100%

In summary, two types of reagent have been described and the methods of preparation disclosed, namely an unstimulated reagent and a stimulated reagent.

The advantages over reagents commonly in use include the stability of the reagents, the elimination of extravasation of the NBT dye, simplicity of the procedure, micro or macro methods may be used with similar results, the elimination of buffers and the accuracy of the results.

As mentioned previously, the reagents when reconstituted with distilled water, are pipetted into aliquots into polypropylene tubes, sealed and frozen, and when kept frozen these reagents are stable for several months insofar as the unstimulated reagents are concerned and for one year or more insofar as the stimulated reagents are concerned.

To perform the tests, the necessary reagent is pre-warmed in a water bath at 37°C approximately whereupon equal amounts of heparinized blood is added. After 25 minutes approximately of incubation at 37°C, smears are made on ordinary glass slides, air dried, Wright's stained and examined under the microscope.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A method for conducting nitroblue tetrazolium tests consisting of the steps of mixing a quantity of nitroblue tetrazolium dye with distilled water, then adding a quantity of dried human plasma and then adding a quantity of heparinzed blood to be tested, letting the results of the mixture incubate at a temperature sufficient to permit incubation, preparing a smear from the mixture, straining the smear in a conventional manner and then counting the P.M.N.-leukocytes having a dark blue deposit.

2. The method according to claim 1 which includes the additional step of freezing the nitroblue tetrazolium dye, water and dried human plasma mixture for storage purposes and thawing same when ready for use.

3. The method according to claim 1 which includes the additional step of dissolving a Lipopolysaccharide in said distilled water.

4. The method according to claim 2 which includes the additional step of dissolving a Lipopolysaccharide in said distilled water.

5. The method according to claim 3 in which said Lipopolysaccharide is chosen from the group containing Lipopolysaccharide E. Coli, Lipopolysaccharide Staphylococcus 17A, Lipopolysaccharide S. Marcescens and Lipopolysaccharide S. Enteritidis.

6. The method according to claim 4 in which said Lipopolysaccharide is chosen from the group containing Lipopolysaccharide E. Coli, Lipopolysaccharide Staphylococcus 17A, Lipopolysaccharide S. Marcescens and Lipopolysaccharide S. Enteritidis.

7. A reagent for use in nitroblue tetrazolium tests comprising in combination a mixture of distilled water, nitroblue tetrazolium dye and dried human plasma.

8. The reagent according to claim 7 which includes a quantity of Lipopolysaccharide added to said mixture to produce a stimulating reagent.

9. The reagent according to claim 8 in which the Lipopolysaccharide is chosen from the group including Lipopolysaccharide E. Coli, Lipopolysaccharide Staphylococcus 17A, Lipopolysaccharide S. Marcescens, Lipopolysaccharide S. Enteritidis.

10. The reagent according to claim 8 in which the concentration of Lipopolysaccharide per test is between 1 microgram and 200 micrograms.

11. The reagent according to claim 9 in which the concentration of Lipopolysaccharide per test is between 1 microgram and 200 micrograms.

* * * * *